United States Patent
Shi et al.

(10) Patent No.: US 9,893,587 B2
(45) Date of Patent: Feb. 13, 2018

(54) ELECTRONIC PUMP

(71) Applicant: Hangzhou Sanhua Research Institute Co., Ltd., Hangzhou, Zhejiang (CN)

(72) Inventors: Chuliang Shi, Zhejiang (CN); Junchao Zhang, Hangzhou (CN); Rongrong Zhang, Zhejiang (CN)

(73) Assignee: Zhejiang Sanhua Automotive Components Co., Ltd., Hangzhou, Zhejiang (CN)

( * ) Notice: Subject to any disclaimer, the term of this patent is extended or adjusted under 35 U.S.C. 154(b) by 306 days.

(21) Appl. No.: 14/951,834

(22) Filed: Nov. 25, 2015

(65) Prior Publication Data

US 2016/0164368 A1    Jun. 9, 2016

(30) Foreign Application Priority Data

Dec. 5, 2014   (CN) .......................... 2014 1 0734537

(51) Int. Cl.
    *H02K 5/128*   (2006.01)
    *F04D 13/06*   (2006.01)
    *H02K 5/167*   (2006.01)

(52) U.S. Cl.
    CPC ......... *H02K 5/128* (2013.01); *F04D 13/0633* (2013.01); *F04D 13/0673* (2013.01); *H02K 5/1675* (2013.01); *H02K 2005/1287* (2013.01)

(58) Field of Classification Search
    CPC ............................. H02K 5/128; H02K 5/1675
    See application file for complete search history.

(56) References Cited

U.S. PATENT DOCUMENTS 3,411,450 A * 11/1968 Clifton .................. F04D 13/024
                                                           310/104
4,135,863 A *  1/1979 Davis .................... H02K 49/106
                                                           417/420
5,017,102 A *  5/1991 Shimaguchi ......... G21C 15/243
                                                           376/402

(Continued)

FOREIGN PATENT DOCUMENTS

DE    102004047637 A1    4/2006
DE    102009028310 A1    2/2011

(Continued)

OTHER PUBLICATIONS

Extended European Search Report, dated May 24, 2016, from corresponding European Application No. 15196924.3.

*Primary Examiner* — Robert W Horn
(74) *Attorney, Agent, or Firm* — Wolf, Greenfield & Sacks, P.C.

(57) ABSTRACT

An electronic pump includes a second housing, a rotor part, a stator part and a circuit board. A pump chamber is separated by a partition into a wet chamber allowing a working medium to pass through and at least one dry chamber where there is no working medium passing through, and the rotor part is arranged in the wet chamber. The electronic pump further includes a shaft, a sunken portion is formed at a top portion of the partition, and the shaft and a bottom of the sunken portion are fixed by injection molding. A portion where the rotor part is in contact with the shaft is a cooperation portion of the rotor part, and the cooperation portion is arranged in a cavity of the sunken portion.

20 Claims, 4 Drawing Sheets

(56) References Cited

U.S. PATENT DOCUMENTS

| | | | | |
|---|---|---|---|---|
| 5,644,178 | A | * | 7/1997 | Halm .................. H02K 3/50 310/43 |
| 5,692,886 | A | * | 12/1997 | Kobayashi .......... F04D 13/0646 415/111 |
| 6,524,083 | B2 | * | 2/2003 | Deai .................. F04D 13/064 417/370 |
| 8,398,384 | B2 | * | 3/2013 | Peterreins ........... F04D 13/0626 29/596 |
| 8,928,195 | B2 | * | 1/2015 | Ohashi ................ H02K 1/32 310/54 |
| 9,570,949 | B2 | * | 2/2017 | Kamiya ............... H02K 1/278 |
| 2001/0033800 | A1 | | 10/2001 | Deai et al. |
| 2006/0171801 | A1 | | 8/2006 | Manabe et al. |
| 2012/0195754 | A1 | | 8/2012 | Hein et al. |

FOREIGN PATENT DOCUMENTS

| | | |
|---|---|---|
| EP | 2273123 A1 | 1/2011 |
| GB | 979009 A | 1/1965 |

* cited by examiner

ELECTRONIC PUMP

CROSS-REFERENCE TO RELATED APPLICATIONS

This application claims the benefit of priority to Chinese Patent Application No. 201410734537.0 titled "ELECTRONIC PUMP", filed with the Chinese State Intellectual Property Office on Dec. 5, 2014, the entire disclosure of which is incorporated herein by reference.

TECHNICAL FIELD

The present application relates to a liquid circulation system, which is specifically an electronic pump.

BACKGROUND

In recent decades, the automobile industry has rapidly developed, and as the performances of an automobile develop in the direction of becoming safer, more reliable, more stable, automatic and intelligentized, and environment-friendly and energy-saving, electronic pumps gradually replace the traditional mechanical pumps and are massively used in the automotive thermal circulation systems. The electronic pumps have the advantages of having no electromagnetic interference, high efficiency and environment-friendly, and stepless speed regulation, thereby well meeting the requirements of the market.

A stator part and a rotor part of the electronic pump are completely separated by a partition, thus avoiding a liquid leakage problem of a traditional motor-type brushless direct current electronic pump. The electronic pump includes a disk-type electronic pump, an internal-rotor-type electronic pump and an external-rotor-type electronic pump. The external-rotor-type electronic pump has a good heat dissipation performance. However as discovered by the inventors that, in the external-rotor-type electronic pump, a portion, cooperating with a shaft, of the rotor part has a very small length, thus a serious vibration may be generated when the rotor part is rotating, which may adversely affect the performance and the service life of the electronic pump.

SUMMARY

An electronic pump is provided according to the present application, which can improve the dynamic balance of a rotor part.

An electronic pump includes a first housing, a second housing, an end cover, a rotor part, a stator part and a circuit board. The first housing, the second housing and the end cover are fixedly connected to form a pump chamber of the electronic pump, and the pump chamber is divided by an partition into a wet chamber allowing a working medium to pass through and at least one dry chamber where there is no working medium passing through. The rotor part is arranged in the wet chamber, and the stator part and the circuit board are arranged in the dry chamber. The electronic pump further includes a shaft, and the shaft and the partition are fixed by injection molding. The partition includes a first side wall configured to separate the stator part from the rotor part and a top portion fixed to the shaft, and a sunken portion sinking from an exterior of the partition to an interior of the partition is formed at a central area at the top portion of the partition. The partition forms a partition cavity. The sunken portion includes a second side wall and a bottom, and forms a sunken cavity. The stator part is arranged in the partition cavity, the rotor part is arranged outside the partition cavity, and the shaft is fixed to the bottom of the sunken portion. An upper end of the shaft extends out of the partition, the rotor part cooperates with an extending section of the shaft, and a portion of the rotor part of a rotation pair between the rotor part and the shaft is a cooperation portion of the rotor part. The rotor part has a rotor cavity. The cooperation portion includes a first portion located above a lowest portion of a cavity top surface of the rotor cavity and a second portion extending from the lowest portion of the cavity top surface into the rotor cavity, and except for a portion corresponding to a clearance between the rotor part and the partition along an axial direction of the shaft, at least a part of the second portion is located in the sunken cavity.

In the present application, the sunken portion is arranged on the partition to accommodate a part of the cooperation portion of the rotor part, thus the length of the cooperation portion is increased without increasing a total height of the electronic pump, which allows the rotor part to be operated more smoothly, and facilitates improving the operating performance and the service life of the electronic pump.

DETAILED DESCRIPTION

Figure 1:
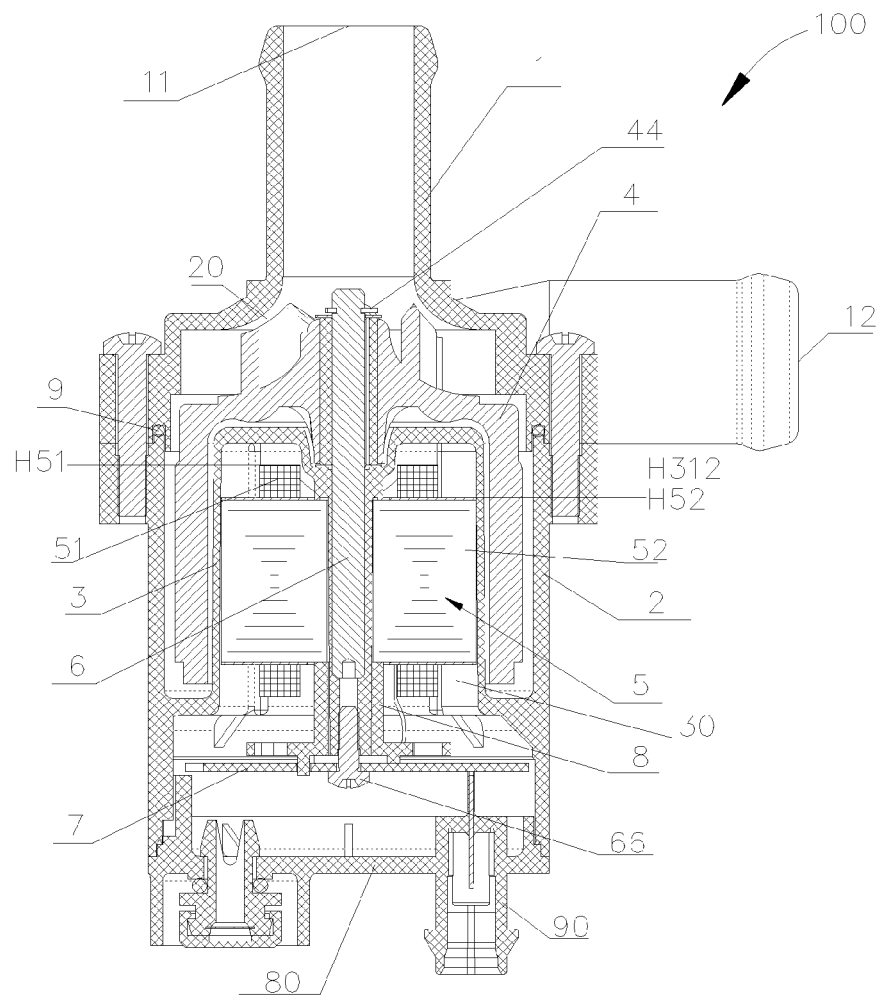
FIG. 1 is a schematic view showing the structure of an electronic pump according an embodiment of the present application.
Figure 2:
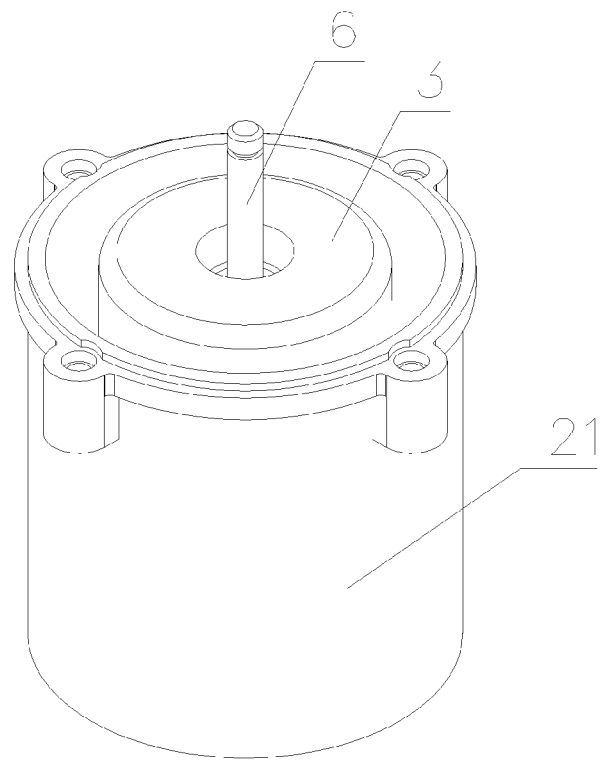
FIG. 2 is a schematic view showing the structure of an injection molding part of a shaft and a second housing in FIG. 1.
Figure 3:
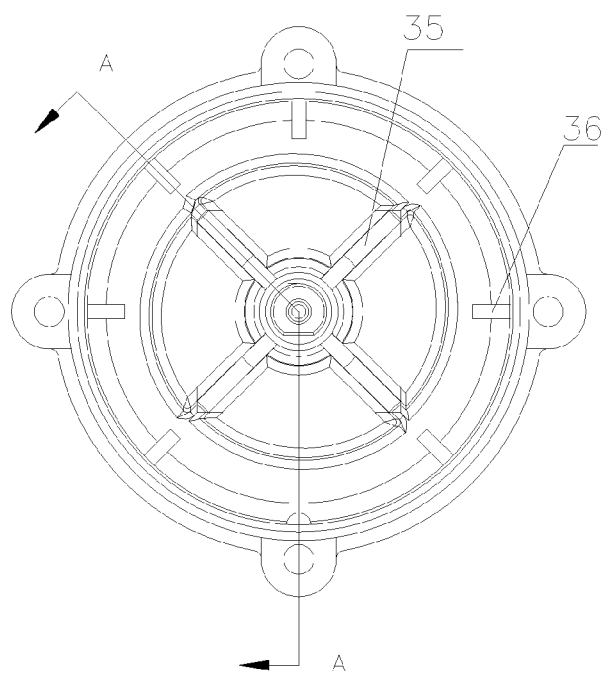
FIG. 3 is a bottom schematic view showing the structure of FIG. 2.

Referring to FIG. 1, an electronic pump 100 includes a first housing 1, a second housing 2, a rotor part 4, a stator part 5, a shaft 6, a circuit board 7, and an end cover 80. The first housing 1, the second housing 2 and the end cover 80 are fixedly connected and form a pump chamber. In this embodiment, an annular sealing ring 9 is provided on a connection portion where the first housing 1 and the second housing 2 are connected, and the annular sealing ring 9 may prevent a working medium from leaking out via the connection portion and meanwhile may prevent an external medium from permeating into the pump chamber. The working medium may be liquid. The electronic pump 100 has a partition 3, and the pump chamber is divided into a wet chamber 20 and a dry chamber 30 by the partition 3. The wet chamber 20 allows the working medium to flow through, and the rotor part 4 is arranged in the wet chamber 20. There is no working medium passing through the dry chamber 30, and the stator part 5 and the circuit board 7 are arranged in the dry chamber 30. The shaft 6 and the partition 3 are fixed by injection molding, and the circuit board 7 is fixedly connected to the shaft 6 and/or the partition 3 via a connection unit 8. The stator part 5 and a control circuit are connected to external circuits via a connector 90, and the control circuit of the electronic pump 100 includes the circuit board 7 and electronic parts on the circuit board 7.

In this embodiment, the electronic pump 100 is an external-rotor-type electronic pump, the external-rotor-type electronic pump refers to that the shaft 6 is taken as a center, and a rotor portion of the rotor part 4 is located at a periphery of the stator part 5, that is, the rotor portion is arranged to surround the periphery of the stator part 5. The external-rotor-type electronic pump has a good heat dissipation performance and a simple structure, and is easy to manufacture and suitable for being used in an automotive thermal circulation system. When the electronic pump 100 is working, the connector 90 is used to connect the stator part 5 and the control circuit to an external circuits, and the control circuit controls a current passing through the stator part 5 and controls the current to change according to a certain rule, then the stator part generates a changing magnetic field, and the rotor portion of the rotor part 4 rotates around the shaft 6 under the action of the magnetic force, to further drive the wheel portion of the rotor part 4 to rotate, which allows the working medium entered the wet chamber 20 to rotate with the wheel portion, and allows the working medium to leave the wet chamber 20 due to the centrifugal force and generates a power for flowing.

As shown in FIG. 1, in this embodiment, the first housing 1, the second housing 2 and the end cover 80 are connected to form the pump chamber. As shown in FIG. 1, the first housing 1 is embodied as an injection molding part, which is formed with an inlet 11 and an outlet 12 by injection molding. When the electronic pump 100 is working, the working medium enters the wet chamber 20 via the inlet 11 and leaves the wet chamber 20 via the outlet 12.

Referring to FIGS. 1 to 4, the second housing 2 is embodied as an injection molding part, which is formed by injection molding with the shaft 6 as an insert. The second housing 2 includes an external housing 21 and the partition 3, and the external housing 21, the first housing 1 and the end cover 80 are connected to form the pump chamber. In this embodiment, the partition 3 is a part of the second housing 2, and the dry chamber 30 is formed between the partition 3 and the end cover 80. By configuring the partition 3 as a part of the second housing 2, an amount of moulds used in manufacture may be decreased, and a sealing performance of the interior of the electronic pump is great. Of course, the partition 3 may also be separately formed, and accordingly the dry chamber 30 includes a space between the partition 3 and the end cover 80. In the case that the partition 3 is separately formed, the moulds are simple.

Figure 4:
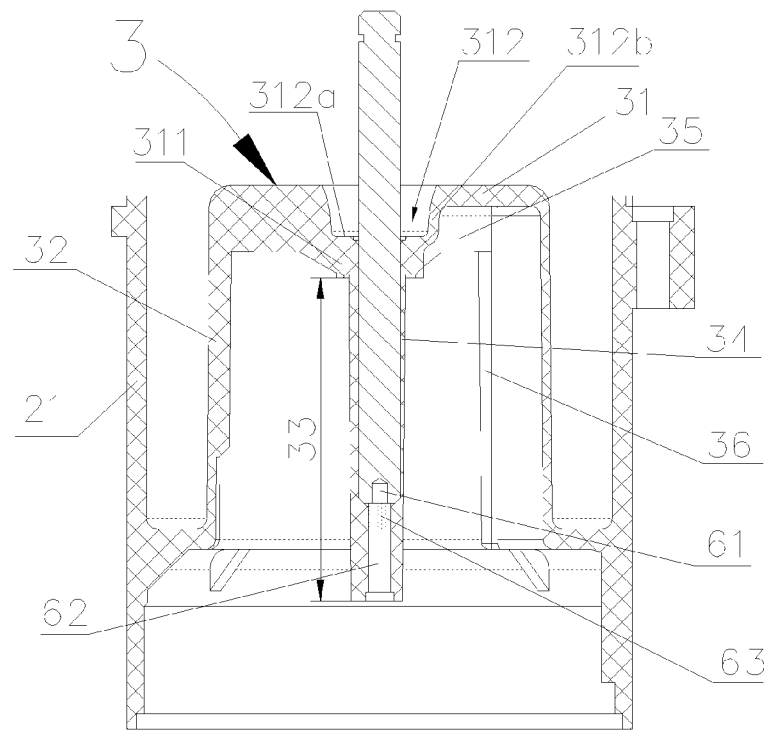
FIG. 4 is a sectional view of FIG. 3 taken along the line A-A.

Specifically, referring to FIGS. 1 and 4, the partition 3 forms a partition cavity. The partition 3 has an opening facing downward, and includes a top portion 31, a first side wall 32 and an axial column 33. The partition cavity includes a space formed by the top portion 31 and the first side wall 32. The pump chamber is divided into a portion in the partition 3 and a portion outside the partition 3 by the partition 3. The axial column 33 is arranged in the partition cavity to form an axial center shaft for mounting the stator part 5.

The top portion 31 and the shaft 6 are fixed by injection molding, and a sunken portion 312 sinking from the top portion 31 to the interior of the partition 3 is formed at the top portion 31. The sunken portion 312 includes a bottom 312a and a second side wall 312b. The sunken portion 312 forms a sunken cavity. For preventing the second side wall 312b of the sunken portion 312 from interfering with the mounting of the stator part 5, the thickness of the second side wall 312b of the sunken portion 312 is configured to be smaller than the thickness of the top portion 31. To ensure the strength of the second side wall 312b, reinforcing ribs 35 are provided at an outer side of the second side wall 312b. The reinforcing ribs 35 connect an inner side surface of the top portion 31 to the second side wall 312b, and are starting from the second side wall 312b and ending at the inner wall of the first side wall of the partition 3 and are arranged divergently.

The partition 3 includes a partition fixing portion which is fixed to the shaft 6 by injection molding, and the partition fixing portion is formed at the bottom 312a of the sunken portion 312 and a portion below the bottom 312a. The partition fixing portion includes the bottom 312a of the sunken portion 312, a fixing strengthening portion 311 and a coating layer 34. The fixing strengthening portion 311 is formed at the bottom 312a, and is an annular step encircling the shaft and protruding from the bottom 312a to the interior of the partition 3, and the axial column 33 is formed by a lower surface of the fixing strengthening portion 311 protruding downward. In this embodiment, the axial column 33 includes a part of the shaft 6 and the coating layer 34 of the shaft 6, in this way, the coaxiality between the axial column 33 and the shaft 6 can be ensured, which further ensure the coaxiality between the rotor part 4 and the stator part 5. In addition, a resistance may be generated to prevent the working medium in the wet chamber from entering the dry chamber 30 via a clearance between the shaft 6 and the coating layer 34. To prevent the shaft 6 from being deviated during the injection molding process, a center hole 61 is formed at a tail end of the shaft 6, and during the injection molding process, a clamp is used to clamp one end of the shaft 6 that is extending out of the partition 3, and a positioning pin is inserted into the central hole 61 to ensure that the deviation of the central axis of the shaft 6 during the injection molding process is within a control range. A shaft hole 62 is formed at a tail end, which is enveloped by the shaft 6, of the coating layer 34, and the shaft hole 62 is a mounting hole for a tapping screw. For ensuring the sealing performance, a sealant 63 may be filled into the shaft hole 62, and the sealant 63 is filled into the shaft hole 62 at a side of the shaft hole 62 close to the shaft 6, and the filling depth of the sealant 63 is less than the length of the shaft hole 62. Besides, the filling of the sealant 63 may further prevent the working medium in the wet chamber 20 from entering the dry chamber 30 via the clearance between the shaft 6 and the coating layer 34. As shown in FIG. 1, a tapping screw 66 is connected to a tail end of the shaft through the shaft hole 62, and the circuit board 7 is fixedly connected to the shaft 6 and/or the second housing 2 via the tapping screw 66. In this embodiment, a direction where the inlet 11 is located is defined as an upward direction, and an opening direction of the partition 3 is defined as a downward direction, and the definition of the upward and downward directions is only for ease of description, and is not relevant to the mounting direction of the electronic pump 100.

In this embodiment, a motor of the electronic pump includes the rotor part 4, the stator part 5, and the control circuit. The rotor part 4 is arranged in the wet chamber 20, and the stator part 5 and the control circuit are arranged in the dry chamber 30.

Figure 5:
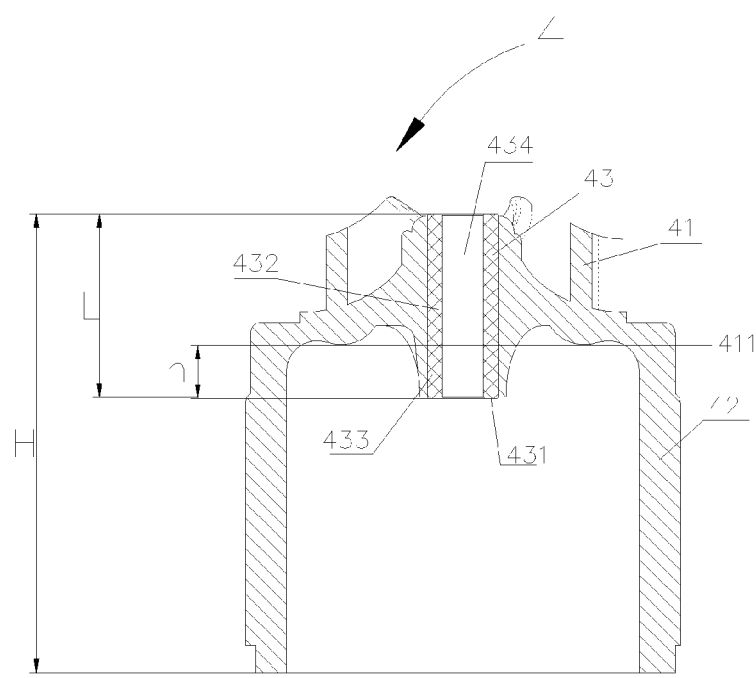
FIG. 5 is a schematic view showing the structure of a rotor part in FIG. 1.

As shown in FIG. 5, in this embodiment, the rotor part 4 is an injection molding part formed integrally, and is formed by injection molding with a bearing sleeve 43 as an insert. The rotor part 4 includes a wheel portion 41, a rotor portion 42 and the bearing sleeve 43. The rotor part 4 is arranged outside the partition 3. The rotor part 4 is of a bell shape, and includes a side wall and a top portion, the side wall includes the rotor portion 42, and the bearing sleeve 43 and the wheel portion 41 are arranged at the top portion of the rotor part 4.

The rotor part 4 forms a rotor cavity, and the rotor cavity includes a space formed by the side wall and the top portion. The bearing sleeve 43 extends into the rotor cavity by a certain distance h, to allow a plane, where a lower end 431 of the bearing sleeve 43 is located, to be lower than a plane where a cavity top surface 411 of the rotor part 4 is located, thereby further increasing the length of the bearing sleeve 43 under the condition that a total height of the rotor part 4 is constant. Specifically, a length L of the bearing sleeve 43 may be configured to be greater than or equal to a quarter of the total height H of the rotor part 4, and is preferably greater than one third of H, thus the length of a cooperation portion of the rotor part 4 is increased, and in this way, the stability of a cantileveredly supported rotor part can be enhanced, and the vibration of the rotor part 4 when rotating with respect to the shaft 6 may be prevented. The bearing sleeve 43 is sleeved on the shaft 6, and in this embodiment, a rotation pair is formed by the bearing sleeve 43 and the shaft 6, the bearing sleeve 43 is the cooperation portion of the rotor part 4, and the cooperation portion includes a first portion 432 located above the cavity top surface 411 of the rotor part 4 and a second portion 433 extending from the cavity top surface 411 into the rotor cavity. An inner bore 434 of the bearing sleeve 43 is located at the top of the bell-shaped rotor part 4 and runs through the rotor part 4.

The stator part 5 is arranged in the partition cavity, the axial column 33 limits the position of the stator part 5 in an axial direction, and makes a central axis of the stator part 5 to be substantially coincided with a central axis of the axis column 33 to prevent the stator part 5 from rotating with respect to the axial column 33 by a large angle. An upper end of the stator part 5 is limited by the annular step of the fixing strengthening portion 311, which prevents the stator part 5 from moving upward with respect to the partition 3. A lower end of the stator part 5 is fixed by the connection unit 8, the tapping screw 66 and the shaft hole 62, to fix the stator part 5 in the partition cavity. For limiting the rotation of the stator part 5, reinforcing ribs 36 are formed on the first side wall 32 of the partition 3. After the stator part 5 is fixedly connected to the second housing 2, a plane H312, where the bottom 312a of the sunken portion 312 at the top portion 31 of the partition 3 is located, may be slightly lower than a plane H51, where an outer surface 511 of a coil 51 of the stator part 5 is located, and may be higher than a plane H52, where an upper surface 521 of a stator core 52 of the stator part 5 is located. The second side wall 312b of the sunken portion 312 is arranged at an inner side of an area encircled by the coil 51. A projection surface of the sunken portion 312 along an axial direction of the shaft 6 is located in the area encircled by the coil 51, and a projection surface of the sunken portion 312 along a direction perpendicular to the axial direction of the shaft 6 is located above the stator core 51, thus the motor will not be affected by the sunken portion 312. Except for a portion corresponding to the clearance between the rotor part 4 and the partition 3 in the axial direction of the shaft 6, the second portion 433, below the cavity top surface of the rotor part 4, of the cooperation portion of the rotor part 4 is located in the sunken cavity. With this design, without changing the height of the electronic pump 100, the length of the cooperation portion between the rotor part 4 and the shaft 6 is increased through the sunken portion 312 and the length of the bearing sleeve 43 extending into the rotor part 4, which improves the dynamic balance of the rotor part 4 during operation, and further reduces the vibration of the rotor part 4 when moving, thereby improving the operating performance of the electronic pump 100. Besides, the shaft 6 extends into an interior of the axial column 33 of the stator part 5, which not only ensures the coaxiality between the stator part 5 and the rotor part 4, but also increases the length of the shaft 6, especially increases the fixing length of the shaft 6. For the cantileveredly supported rotor part 5, the stability of fixing the shaft 6 is enhanced, which also improves the dynamic balance of the rotor part 4 during operation.

Figure 6:
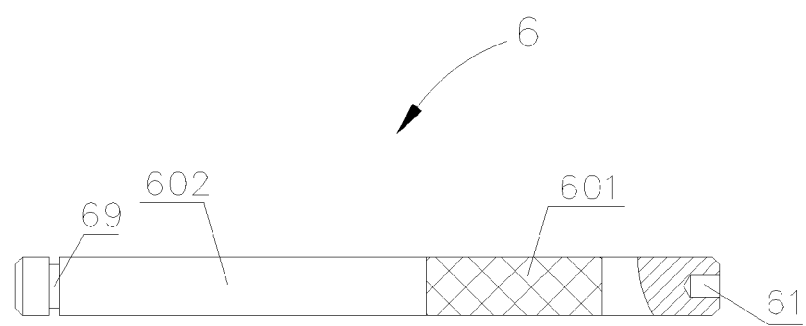
FIG. 6 is a schematic view showing the structure of the shaft in FIG. 1.

The second housing 2 is formed by injection molding with the shaft 6 as an insert, the rotor part 4 rotates around the shaft 6, and the stator part 5 is mounted by taking the shaft 6 as a center. As shown in FIG. 6, which is a schematic view showing the structure of the shaft 6 in this embodiment, the shaft 6 includes a shaft fixing portion 601, and a mounting portion 602 for the rotor part 4. The shaft fixing portion 601 is fixed to the partition 3 of the second housing by injection molding, and an outer surface of the shaft fixing portion 601 is processed to have a grooved structure, a threaded structure, or a meshed structure, thereby allowing the shaft 6 and the partition 3 of the second housing 2 to be tightly combined and to prevent liquid leakage, and also preventing the shaft 6 from moving or rotating with respect to the partition 3 of the second housing 2. A center hole 61 is provided at a tail end of the shaft fixing portion 601, and the mounting portion 602 for the rotor part 4 is provided with an annular groove 69, and the annular groove 69 is configured to install an axial position-limiting member of the rotor part 4.

The electronic pump 100 includes a position-limiting member to limit the position of the rotor part 4 and fix the rotor part 4. Specifically, the position-limiting device includes a snap ring 44 and the annular groove 69 arranged in the shaft 6. The snap ring 44 is arranged in the annular groove 69, and the annular groove 69 is arranged at the tail end of the shaft 6 that is in the wet chamber 20. Besides, the electronic pump 100 further includes two gaskets, and the two gaskets are arranged on the shaft 6 and include a first gasket and a second gasket. The first gasket is arranged between the snap ring 44 and a tail end of the bearing sleeve 43, and the second gasket is arranged between the partition 3 and another tail end of the bearing sleeve 43. When the electronic pump 100 is operating, the first gasket is arranged between one tail end of the bearing sleeve 43 and the snap ring 44, and the second gasket is arranged between another tail end of the bearing sleeve 43 and the partition 3, which may prevent the bearing sleeve 43 from rubbing the snap ring 44 and the partition 3, thereby decreasing the frictional loss and increasing the service life of the electronic pump.

As shown in FIG. 1, the electronic pump 100 further includes the connection unit 8, and the circuit board 7 is connected to the coil of the stator part 5 by the connection unit 8. The circuit board 7 and the connection unit 8 are fixedly connected to the shaft 6 via the tapping screw 66 (as shown in FIG. 1), and at the same time support a lower surface of the stator part 5, to prevent the stator part 5 from moving in the axial direction, and limit the position of the stator part 5 along the axial direction of the shaft 6.

It should be noted that, the above embodiments are only intended for describing the technical solutions of the present application, and should not be interpreted as limitation to the present application. Although the present application is described in detail in conjunction with the above embodiments, it should be understood that, for those skilled in the art, modifications or equivalent substitutions may be made to the present application, and any technical solutions and improvements thereof made within the spirit and scope of the present application are also deemed to fall into the scope of the present application defined by the claims.

What is claimed is:

1. An electronic pump, comprising a first housing, a second housing, an end cover, a rotor part, a stator part and a circuit board; the first housing, the second housing and the end cover being fixedly connected to form a pump chamber of the electronic pump, and the pump chamber being divided by a partition into a wet chamber allowing a working medium to pass through and at least one dry chamber where there is no working medium passing through, wherein the rotor part is arranged in the wet chamber, and the stator part and the circuit board are arranged in the dry chamber; the electronic pump further comprises a shaft, and the shaft and the partition are fixed by injection molding; the partition has a partition cavity, the partition comprises a first side wall configured to separate the stator part from the rotor part and a top portion fixed to the shaft, a sunken portion sinking from an exterior of the partition to an interior of the partition is formed at a central area at the top portion of the partition, the sunken portion comprises a second side wall and a bottom, and has a sunken cavity, the stator part is arranged in the partition cavity, the rotor part is arranged outside the partition cavity, and the shaft is fixed to the bottom of the sunken portion; an upper end of the shaft extends out of the partition, the rotor part cooperates with an extending section of the shaft, and a portion of the rotor part of a rotation pair between the rotor part and the shaft is a cooperation portion of the rotor part; the rotor part has a rotor cavity, the cooperation portion comprises a first portion located above a lowest portion of a cavity top surface of the rotor cavity, and a second portion extending from the lowest portion of the cavity top surface into the rotor cavity, and at least a part of the second portion is located in the sunken cavity.

2. The electronic pump according to claim 1, wherein a length of the rotation pair between the rotor part and the shaft along the direction of the shaft is greater than or equal to a quarter of a height of the rotor part.

3. The electronic pump according to claim 2, wherein the rotor part comprises a bearing sleeve, and a wheel portion and a rotor portion which are formed by injection molding with the bearing sleeve as an insert, the rotor portion comprises a magnetic part, the bearing sleeve is the cooperation portion of the rotor part, and a length of the bearing sleeve is greater than or equal to one third of the height of the rotor part.

4. The electronic pump according to claim 1, wherein a fixing strengthening portion for fixing the shaft is formed at the partition, and comprises an annular step enclosing the shaft, and the annular step is formed at the bottom of the sunken portion and protruding to the interior of the partition cavity.

5. The electronic pump according to claim 1, wherein the stator part includes at least one coil, in an axial direction of the shaft, a plane where the bottom of the sunken portion is located is lower than an outer surface of the coil of the stator part, and an outer diameter of the bottom of the sunken portion is smaller than an inner diameter of the coil, to allow a projection of the sunken portion along the axial direction of the shaft to be located in the coil.

6. The electronic pump according to claim 1, wherein the second side wall of the sunken portion has a thickness smaller than a thickness of the top portion of the partition, at least one of reinforcing ribs is provided at an outer side of the second side wall and are configured to connect an inner side of the top portion and the second side wall, and the reinforcing ribs start from the second side wall and end at an inner wall of the partition and are divergently arranged.

7. The electronic pump according to claim 4, wherein an axial column is formed from the bottom of the partition to the interior of the partition cavity, the stator part is sleeved on the axial column and is centrosymmetrically arranged around a central axis of the axial column, and the axial column comprises a part of the shaft and a coating layer of the shaft.

8. The electronic pump according to claim 7, wherein a center hole is provided at a tail end, provided with the coating layer, of the shaft, and a central axis of the central hole is approximately superposed with the central axis of the shaft.

9. The electronic pump according to claim 8, wherein a shaft hole is formed in the coating layer corresponding to the central hole of the shaft, the axial column is connected to a screw, and the circuit board and the axial column are fixedly connected via the screw.

10. The electronic pump according to claim 7, wherein the shaft comprises a shaft fixing portion; a grooved structure, a threaded structure, or a meshed structure is formed on an outer surface of the shaft fixing portion, the partition comprises a partition fixing portion; the shaft and the partition are fixed through the shaft fixing portion and the partition fixing portion, and the partition fixing portion comprises the bottom of the sunken portion, the fixing strengthening portion, and the coating layer.

11. The electronic pump according to claim 9, wherein the electronic pump further comprises a connection unit; the stator part is fixed in the shaft hole formed by the coating layer along the axial direction of the shaft via the connection unit and a screw, to fix the circuit board to the second housing or the shaft.

12. The electronic pump according to claim 3, wherein a fixing strengthening portion for fixing the shaft is formed at the partition, and comprises an annular step enclosing the shaft, and the annular step is formed at the bottom of the sunken portion and protruding to the interior of the partition.

13. The electronic pump according to claim 5, wherein the second side wall of the sunken portion has a thickness smaller than a thickness of the top portion of the partition, at least one of reinforcing ribs is provided at an outer side of the second side wall and are configured to connect an inner side of the top portion and the second side wall, and the reinforcing ribs start from the second side wall and end at an inner wall of the partition and are divergently arranged.

14. The electronic pump according to claim 3, wherein an axial column is formed from the bottom of the partition to the interior of the partition cavity, the stator part is sleeved on the axial column and is centrosymmetrically arranged around a central axis of the axial column, and the axial column comprises part of the shaft and a coating layer of the shaft.

15. The electronic pump according to claim 4, wherein an axial column is formed from the bottom of the partition to the interior of the partition cavity, the stator part is sleeved on the axial column and is centrosymmetrically arranged around a central axis of the axial column, and the axial column comprises a part of the shaft and a coating layer of the shaft.

16. The electronic pump according to claim 6, wherein an axial column is formed from the bottom of the partition to the interior of the partition, the stator part is sleeved on the axial column and is centrosymmetrically arranged around a central axis of the axial column, and the axial column comprises a part of the shaft and a coating layer of the shaft.

17. The electronic pump according to claim 8, wherein the shaft comprises a shaft fixing portion; a grooved structure, a threaded structure, or a meshed structure is formed on an outer surface of the shaft fixing portion, the partition comprises a partition fixing portion; the shaft and the partition are fixed through the shaft fixing portion and the partition fixing portion, and the partition fixing portion comprises the bottom of the sunken portion, the fixing strengthening portion, and the coating layer.

18. The electronic pump according to claim 9, wherein the shaft comprises a shaft fixing portion; a grooved structure, a threaded structure, or a meshed structure is formed on an outer surface of the shaft fixing portion, the partition comprises a partition fixing portion; the shaft and the partition are fixed through the shaft fixing portion and the partition fixing portion, and the partition fixing portion comprises the bottom of the sunken portion, the fixing strengthening portion, and the coating layer.

19. The electronic pump according to claim 10, wherein a length of the shaft is greater than a total length of the rotation pair and the partition fixing portion of the partition.

20. The electronic pump according to claim 9, wherein a sealant is filled in the shaft hole, a filling length of the sealant is less than a length of the shaft hole, and the screw is fixed to the axial column via the sealant, to form seal.

* * * * *